Dec. 30, 1924.
W. H. GREET
SAFETY DEVICE FOR CARS
Filed July 14, 1921
1,521,527
2 Sheets-Sheet 2
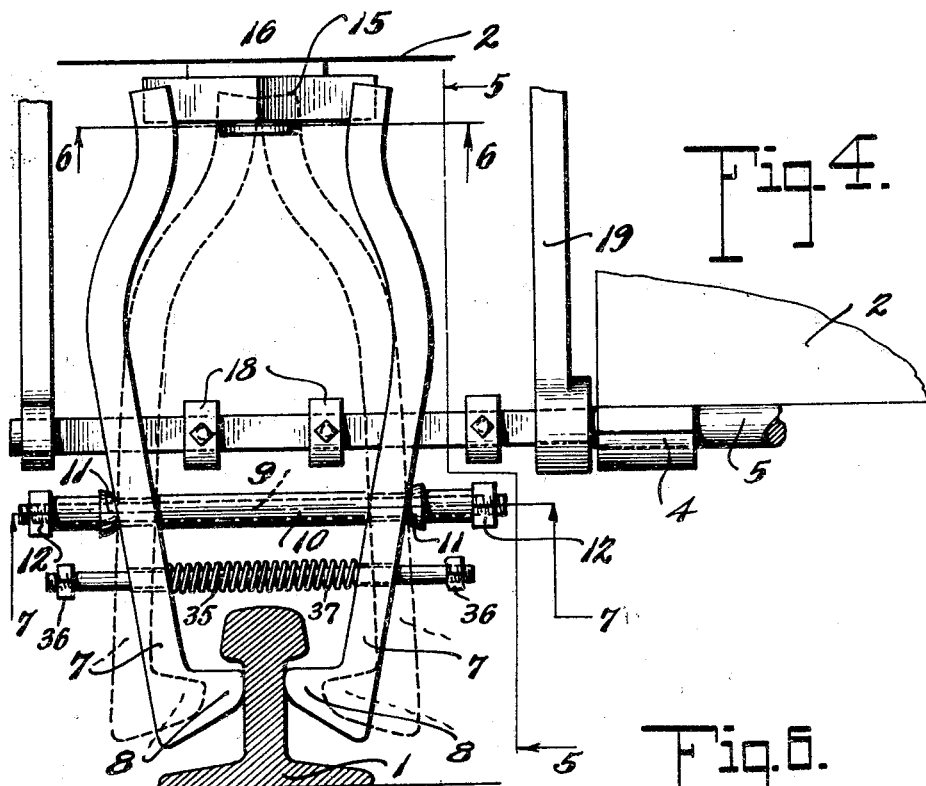
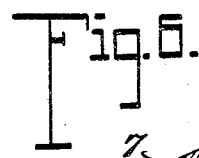
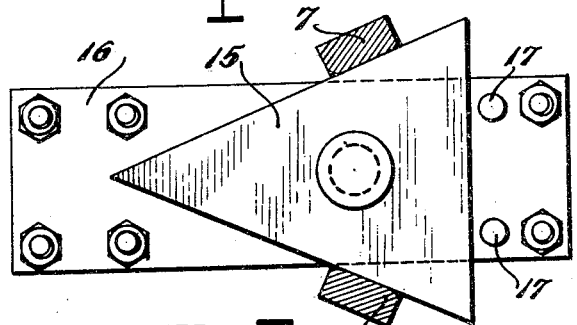
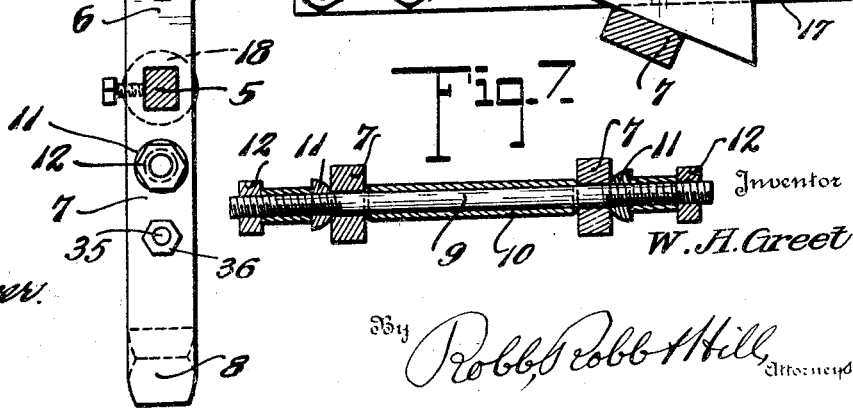
Inventor
W. H. Greet Patented Dec. 30, 1924.

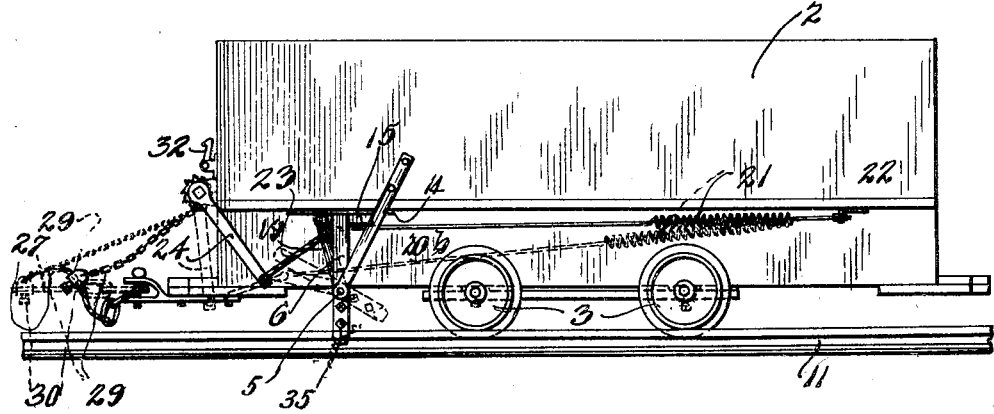

1,521,527

UNITED STATES PATENT OFFICE.

WILLIAM H. GREET, OF GEBO, WYOMING.

SAFETY DEVICE FOR CARS.

Application filed July 14, 1921. Serial No. 484,729.

*To all whom it may concern:*

Be it known that I, WILLIAM H. GREET, a citizen of the United States, residing at Gebo, in the county of Hot Springs and State of Wyoming, have invented certain new and useful Improvements in Safety Devices for Cars, of which the following is a specification.

My invention relates to safety devices for vehicles, and more particularly to those applicable to mine or ore cars which are operated upon rails on grades or inclines, by means of a cable, controlled by an engine or the like, and more particularly to devices which upon breaking or sudden slacking of the operating cable, will be automatically rendered operative to engage the rails to prevent retrograde movement of the car.

An object of my invention is to provide a rail-engaging device which is simple in construction, positive in action, and entirely automatic in operation, being rendered inoperative upon relative movement between the operating cable and the car in one direction, and rendered operative upon similar movement of the operating cable in the other direction.

A further object of my invention is to provide means to positively render the rail-engaging or gripping means inoperative at times when found desirable, such as when handling cars on the level without cable operating means.

A still further object in view is to provide a type of rail gripping means which is moved into inoperative position beneath the car out of engaging relation to the rails as an incident to draft stress upon the hauling cable but which instantly assumes frictional engaging relation with respect to the rails upon sudden slackage or breakage of the said cable, which frictional engagement becomes increasingly effective by virtue of the very engagement itself upon the said gripping means in the retrograde movement of the car.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a side elevation of a car having my invention applied thereto. Full lines represent the device in operative position, and dotted lines show the device in inoperative position.

Figure 2 is a bottom plan view of car as shown in Figure 1, the safety device being shown in non-gripping position.

Figure 3 is an end view of car as seen in Figure 1, the safety device being shown in gripping or engaged position.

Figure 4 is an enlarged fragmentary view of one of the gripper elements shown in full lines in rail-engaging position, and in released position in dotted lines.

Figure 5 is a sectional view on line 5—5 of Figure 4.

Figure 6 is a sectional view on the line 6—6 of Figure 4 showing in detail one of the wedge plates and its movement limiting pins.

Figure 7 is a section on line 7—7 of Figure 4.

Throughout the following detailed description and on the several figures of the drawing, similar parts are referred to by like reference characters.

Referring to the drawings, reference numeral 1 indicates supporting rails and 2 a car having wheels 3.

Secured transversely beneath the front portion of the car by means of bearings 4 is a shaft 5 having its end portions square in cross-section. Mounted on the squared end portions of the shaft 5 are a pair of rail grips 6. Each rail grip comprises a pair of gripping members 7 each having a square opening intermediate its ends to receive the shaft 5 whereby the gripping members will turn with the shaft.

The members 7 of each rail grip are formed at their lower ends with projections 8 which extend laterally from the members toward each other and are adapted for engagement with the rail. A bolt 9 extends through the member 7 below the shaft 5. This bolt is surrounded by a sleeve 10 which has its ends ground to the shape of a ball joint for engagement with the inner edges of the members 7. Nuts 11 mounted on the ends of the bolt are also ground to the shape of a ball joint for engagement with the outer edges of the members 7. The nuts 11 are held in adjusted position by lock-nuts 12. The bolt 9 and sleeve 10 together with the nuts 11 form a fulcrum device on which the members 7 swing in opening and closing. The open position of the members is shown in Figure 4 in dotted lines and the closed position in Figure 4 in full lines.

In order to move the members 7 to closed or rail-gripping position as shown in Figure 4, the shaft 5 is rotated to swing the upper ends of the members 7 against the inclined sides of the wedge member 15. The wedge member 15 is pivoted to a plate 16 which is fastened in suitable position to the under-side of the car. A pair of stops 17 are provided on the plate 16 to limit turning movement of the wedge by providing for limited rotary movement of the wedge and an even bearing of the members 7 against the inclined sides thereof is assured.

As the upper ends of the members 7 move in contact with the sides of the wedge the camming action of the wedge thereon causes the members 7 to pivot about the sleeve 10 as a fulcrum, thus causing their lower ends to move towards each other and the projections 8 to grip the rail. It will be noted that the members 7 have a swinging movement in the plane of the members and in a plane at right angles to the shaft 5.

Collars 18 fixed on the shaft 5 limit the movement of the members 7 longitudinally of the shaft thereby keeping them in proper position to grip the rail.

Beneath the fulcrum bolt 9 passing through the gripping members, an expanding device is provided and may comprise a rod 35 passing through said members and having stop nuts 36 at each end. Intermediate of the members 7, a coil spring 37 is mounted upon the rod and bears against the opposite jaws to hold the same in open position when out of contact with the closing wedge.

An arm 19 is fastened at its lower end to the shaft 5. A cable 20 is fastened at one end to the upper end of the arm 19 and extends rearwardly beneath the car and has its other end attached to one end of a coil spring 21, the other end of the latter being fastened to a bracket 22 secured to the under-side of the car. The coil spring 21 tends to rotate the shaft 5 in a direction to swing the upper ends of the members 7 of each rail grip 6 against the wedge members 15 to cause said members 7 to grip the rails.

Also fastened at one end to the upper end of the arm 19 is a cable 23 which extends forwardly beneath the car and is attached at its other end to the lower end of an arm 24, the latter being fastened at its upper end to one end of a ratchet shaft 25. The ratchet shaft 25 extends transversely across the front of the car being rotatable in bearings 26. It will be seen that an arm 24 is attached to each end of the shaft 25 and that there is an arm 19 and cables 20 and 23 for each of the rail grips 6.

A cable 27 by means of which to pull the car up the incline is fastened at one end to the front end of the car. A chain 29 is fastened at one end by means of a clamp 30 to the cable 27, the other end of the chain being wrapped on a drum 31 which is mounted on the ratchet shaft 25. When the cable 27 is taut the chain 29 through the ratchet shaft and cables 23 maintains the rail grips 6 in the inoperative position shown in Figure 2. However, should the cable 27 break, the springs 21 acting through the cables 20 would immediately move the grip members to operative position shown in Figure 1. The lower ends of the members 7 would then be in frictional engagement with the rails and the upper ends thereof in frictional engagement with the wedge members 15 and any tendency of the car to move back down the incline would merely tend to rotate the shaft 5 further in the direction to cause the upper ends of the members 7 to move further along the inclined sides of the wedge members 15 thus moving the lower ends of the members 7 into firmer gripping engagement with the rails.

A pawl and ratchet means 32 is provided in connection with the ratchet shaft 25 so that when it is not desired to employ the safety devices they can be maintained in the inoperative positions shown by dotted lines in Figure 1 until the ratchet shaft is released.

The ratchet shaft 25 is formed with means independent of the draft connection by which the gripping members are moved into and held in inoperative position and their actuating spring maintained under tension. This is of practical importance when the cars are at rest on a level and it is necessary to release the grippers in order to move the position of the car. For that purpose the shaft 25 may be manually actuated by the application of a tool to the extended end provided for that purpose and the grippers held in inoperative position by the pawl-and-ratchet 32.

If a number of cars are to be connected together in a train the cable 23 extending from the arm 19 on one car can be fastened to an arm 19 on the car ahead.

Having thus described my invention, what I claim as new and desire to secure by Letters Patent is:

1. The combination with a car, of a safety device therefor comprising a pair of rail gripping members, a supporting shaft passing through said members intermediate their ends, draft means for the car operatively connected to the supporting shaft and normally holding the same with the gripping members swung into inoperative relation to the rails, said gripping members being arranged for the gripping ends thereof to be swung into operative relation to the rails upon breakage of the draft means, and spreading means in the path of swinging movement of the free ends of the gripping members adapted to spread the same as an incident to the last mentioned swinging movement to thereby effect gripping action of the gripping ends on the rail.

2. The combination with a car, of a safety device therefor comprising a pair of rail gripping members, a supporting shaft passing through said members intermediate their ends, draft means for the car connecting to the shaft and normally holding the same with the lower gripping ends swung into inoperative relation to the rails, means for moving the gripping members into operative rail-gripping position, and spreading means mounted on the car in a position to pass between and separate the upper ends of the gripping members when the latter are swung by said last named means to thereby cause closing movement of the lower ends upon the rail.

3. The combination with a car, of a safety device therefor, comprising a pair of rail gripping members, a supporting shaft passing therethrough substantially midway of their length, a lever fixed on said shaft for swinging the gripping members to and from operative relation with respect to the rail, a draft connection for the car connected to said lever and normally maintaining the gripping members swung into inoperative relation to the rail during draft haul on the car, means connected to the shaft for automatically throwing the gripping members into operative gripping relation to the rail upon release of the draft haul stress, and a cam member arranged on the car in the path of swinging movement of the gripping members when swung into operative relation to the rail to pass between the gripping members, said cam member having diverging cam faces effecting the spreading of the upper ends of said gripping members in such movement to thereby cause gripping action on the rail.

4. The combination with a car of a pair of rail gripping members, a shaft for said members, draft means for the car, a shaft to which said draft means is connected formed to receive a tool for effecting its rotation independent of the draft stress, means connecting said draft shaft and gripping members, means for retaining said draft shaft to support the gripping members in inoperative position, and means for automatically moving the gripping members into operating position.

5. The combination with a car, of a pair of rail gripping members, of a supporting shaft for said members, draft means for the car, a shaft to which said draft means is wound formed to receive a tool adapted to effect its rotation independent of the draft stress, a ratchet on said last mentioned shaft having a cooperating fixedly mounted pawl for retaining the shaft and grippers in inoperative position, means connecting said draft shaft and gripping members, and means for automatically moving the gripping members into operative position.

6. The combination with a car, of a safety device therefor comprising a pair of rail gripping members, a supporting shaft passing through said members intermediate their ends, draft means for the car operatively connected to the supporting shaft and normally holding the same with the gripping members swung into inoperative relation to the rails, said gripping members being arranged for the gripping ends thereof to be swung into operative relation to the rails upon breakage of the draft means, spreading means in the path of swinging movement of the free ends of the gripping members adapted to spread the same as an incident to the last mentioned swinging movement to thereby effect gripping action of the gripping ends on the rail, and means separate from the draft means for maintaining the gripping members swung into inoperative relation to the rail during and in the absence of draft haul stress.

7. The combination with a car, of a safety device therefor, comprising a pair of rail gripping members, a supporting shaft passing therethrough substantially midway of their length, a lever fixed on said shaft for swinging the gripping members to and from operative relation with respect to the rail, a draft connection for the car connected to said lever and normally maintaining the gripping members swung into inoperative relation to the rail during draft haul on the car, means connected to the shaft for automatically throwing the gripping members into operative gripping relation to the rail upon release of the draft haul stress, means for rendering the last named means inoperative at will to maintain the gripping members in inoperative position, and a cam member arranged on the car in the path of swinging movement of the gripping members when swung into operative relation to the rail to pass between the gripping members, said cam member having diverging cam faces effecting the spreading of the upper ends of said gripping members in such movement to thereby cause gripping action on the rail.

8. The combination with a car, of a safety device including rail gripping members, a shaft on which said rail gripping members are mounted, a lever connected to said shaft, tensioning means connected to said lever and normally tending to hold the gripping members in operative relation to a rail, a draft cable connected at one end to the car, an actuating shaft mounted on said car, an arm on said shaft operatively connected to the lever on the gripping member shaft, a flexible connection between the actuating shaft and the cable for transmitting movement of the latter to the rail gripping members whereby to hold the same normally in inoperative relation to the rail, and ratchet mechanism on the actuating shaft including a locking pawl for engagement therewith to hold said shaft in the position assumed thereby upon the application of draft stress to the draft cable, whereby to maintain the rail gripping members in inoperative position with respect to the rail.

9. The combination with a car, of a safety device therefor, comprising a shaft rotatably mounted beneath the car body, a pair of rail gripping members mounted upon said shaft for movement therewith to carry their lower ends into and out of gripping position with respect to the rail, means including a cable attached to the shaft for maintaining said members out of rail gripping position, means including a cable and a spring attached to said shaft for moving said members into rail gripping position, means connecting said members for relative pivotal movement permitting said members to be moved into gripping engagement with the rail, means for normally maintaining said members out of gripping engagement with the rail, and means for moving said members into gripping engagement with the rail.

10. The combination with a car, of a safety device therefor, comprising a pair of rail gripping members mounted on the car for pivotal movement in a plane substantially parallel to the rail to carry their lower ends into and out of rail gripping position, means for normally maintaining said members with their lower ends out of rail gripping position, means for moving said members to carry their lower ends into rail gripping position, means pivotally connecting said members for relative movement to carry their lower ends into and out of gripping engagement with the rail, yielding means for normally maintaining the lower ends of said members out of gripping engagement with the rails, and means for cooperation with the upper ends of said members for moving their lower ends toward each other into gripping engagement with the rail.

In testimony whereof I affix my signature.

WILLIAM H. GREET.